INVENTORS
MARK E. CAMPBELL
GEORGE E. O'BRIEN

AGENT

INVENTORS
MARK E. CAMPBELL
GEORGE E. O'BRIEN

BY

*Louis J. Knobbe*

AGENT

United States Patent Office 2,976,618
Patented Mar. 28, 1961

2,976,618

GYRO-COMPASS

Mark E. Campbell, Whittier, and George E. O'Brien, West Covina, Calif., assignors to North American Aviation, Inc.

Filed Jan. 2, 1959, Ser. No. 784,731

7 Claims. (Cl. 33—226)

This invention relates to direction determining apparatus, and in particular to gyro-compasses for measuring directions in azimuth. The invention further relates to gyro-compasses adapted for measuring earth latitude.

A long-time need has existed for a field compass which is portable, quick and easy to operate and above all, highly accurate. Military equipment such as missile launchers and mobile radars require the azimuth direction to be known with high accuracy. In a co-pending application, Serial No. 740,329, entitled "Gyro-Compass," filed June 6, 1958, by Campbell, O'Brien and Pentecost and assigned to North American Aviation, Inc., assignee of the present invention, a single-axis gyro comprising a gyro rotor and associated support, drive, and control members is incorporated in a unique gyro-compass in which undesirable error-causing torques acting on the gyro are readily compensated for. The present invention relates to an alternate method and apparatus for achieving a precise azimuth measuring device.

Accordingly, it is an object of this invention to provide an improved azimuth direction measuring apparatus.

It is another object of this invention to provide an improved gyro-compass.

It is still another object of this invention to provide a gyro-compass which is fundamentally capable of an accuracy comparable with celestial alignment equipment.

A further object of this invention is to provide a gyro-compass which is relatively insensitive to earth vibrations.

It is still another object of this invention to provide a gyro-compass in which the accuracy of the gyroscope is enhanced by compensating for error torques acting on the gyroscope.

A further object of this invention is to provide a highly accurate azimuth direction measuring apparatus operative without regard to location on land or time of day.

It is another object of this invention to provide an improved latitude determining apparatus.

Other and further objects, features and advantages of the invention will become apparent as the description proceeds.

Briefly, in accordance with a preferred form of the present invention, a gyro-compass includes a two axis gyroscope having its rotor isolated from the earth by a set of two gimbals. When the rotor is spinning, the action of the gyro is such that the gyro case, which may comprise an outer gimbal rotatably mounted on a frame affixed to the earth, is stabilized in space about the gyro input axis, i.e., the space rate of rotation of the gyro case about the gyro input axis is zero. In determining azimuth direction, the gyro input axis is constrained to lie in a plane tangent to the geoid. The drift about this axis between the space stabilized gyro case and the earth mounted gyro frame is then measured. When the relative rate of rotation of the gyro case with respect to the gyro frame is zero, the input axis will be parallel to a true east-west line. Means are provided for canceling the effects of error torques acting on the rotor-mounting gimbal thus affording an extremely accurate azimuth measurement.

A more thorough understanding of the invention may be obtained by a study of the following detailed description taken in connection with the accompanying drawings in which.

Figure 3:
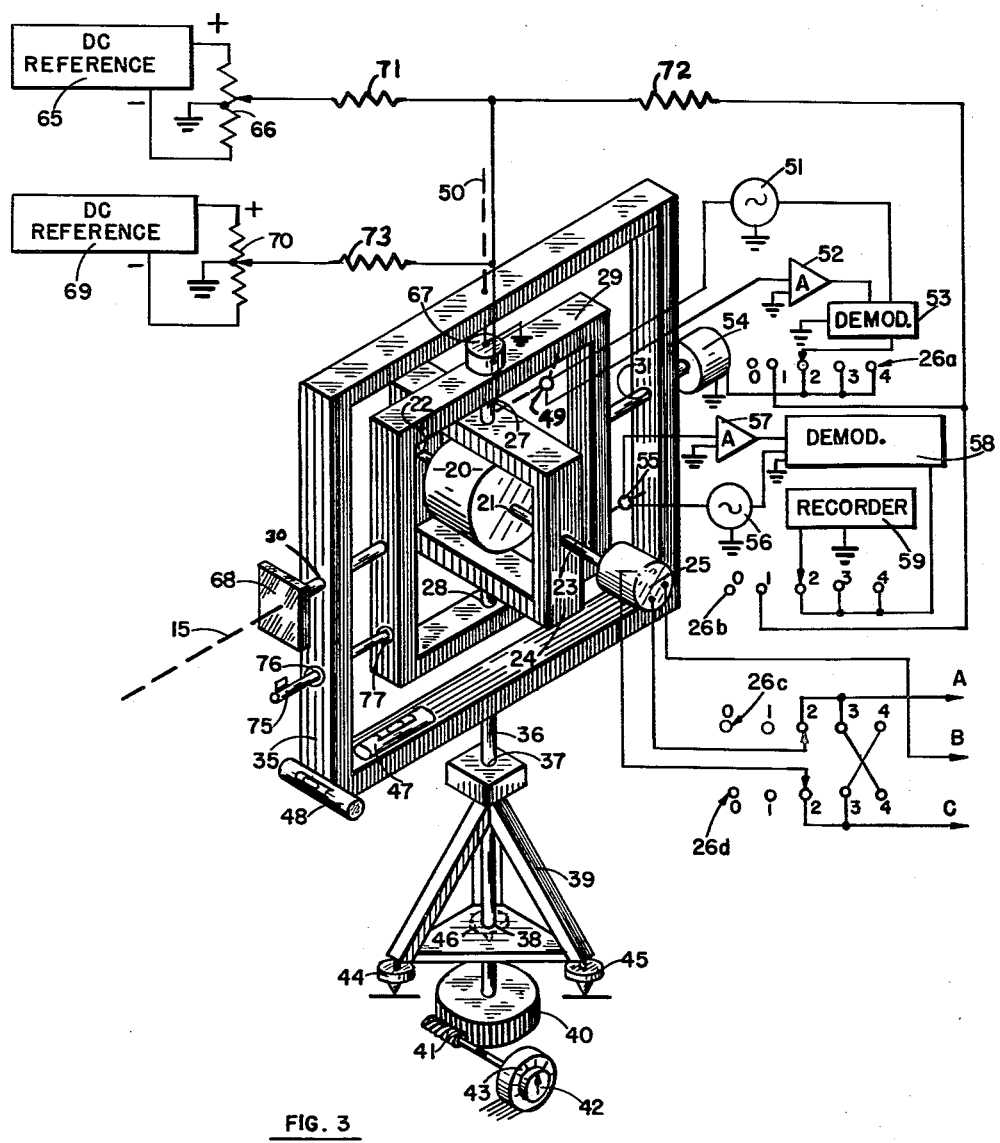

And Fig. 3 is a perspective view, partially schematic, of the gyroscopic apparatus of this invention.

Figure 1:
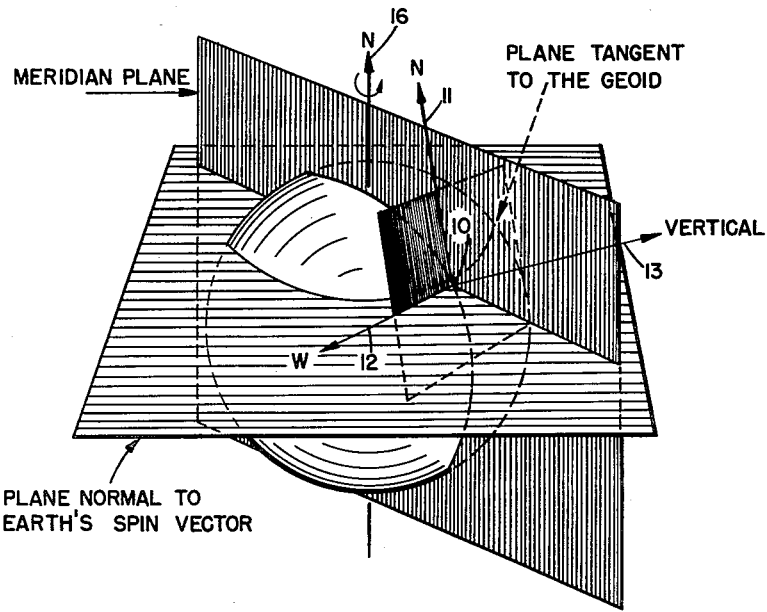
Fig. 1 illustrates the definition of true direction on the geoid.

A true east-west line 12 is defined as the intersection of a plane tangent to the geoid with a plane normal to the earth spin vector 16. A third plane (a meridian plane) shown in Fig. 1 is defined by the earth spin vector 16 and the point 10. An earth vertical 13 lies in the meridian plane and is perpendicular to the plane tangent to the geoid. In practice, this earth vertical is located either as the normal to a free liquid surface of finite, but small area; by the line of suspension of an undisturbed plumb-bob; or by the proper interpretation of the readings of bubble levels. A gravitational anomaly, however, will introduce a small error in locating the earth vertical by these means. If the amount and direction of this gravitational anomaly is known, the error in direction can be predicted. Normal to the true east-west line 12 at point 10 and lying in the plane tangent to the geoid is a true north-south line 11.

Figure 2:
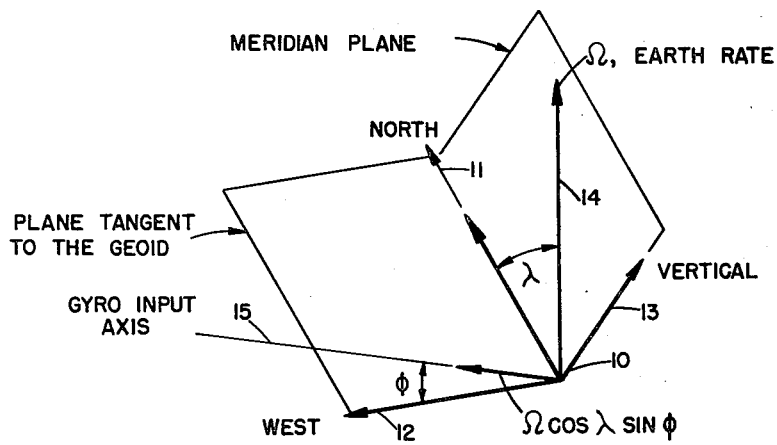
Fig. 2 illustrates how the space rate of rotation of a particular earth-fixed axis may be derived.

Fig. 2 illustrates how a gyroscope sensitive to rotation about a particular axis (input axis) may be utilized to measure earth rotation. The plane tangent to the geoid, the meridian plane, and lines 11, 12 and 13 are the same as those illustrated in Fig. 1. The rate of rotation of the earth in space, $\Omega$, can be visualized as a vector 14 lying in the plane containing the earth's spin vector (the meridian plane) and making an angle $\lambda$ with the true north-south line 11. The northerly component of the earth rate is therefore $\Omega \cos \lambda$, as shown. The input axis of the gyroscope is shown as line 15 lying in the geoid tangent plane, and making a small angle $\phi$ with a true east-west line 12. The component of earth rate lying along the gyro input axis 15 is equal to $\Omega \cos \lambda \sin \phi$. As $\phi$ is made zero by an adjustment in azimuth of the gyro input axis 15, the gyro indication of an earth rate component about the input axis will decrease until the alinement of the gyro input axis to the east-west line 12 is achieved. As noted, the component of earth rate along the gyro input axis is proportional to $\cos \lambda$. The term $\lambda$ varies with the astronomical latitude of point 10. As would be expected, the accuracy and time of alinement for this invention are, therefore, affected by the latitude of operation.

In Fig. 3 is shown the gyroscopic apparatus of this invention. The terms "gyroscope" and "gyro" are interchangeably used herein to define the combination comprising gyro rotor 20, its drive mechanism including motor 25, gimbal 27, case 29, frame 35 and the support bearings associated with these members. The gyro rotor 20 rotates about an axis 21 supported by bearings 22 and 23 contained in an inner gimbal 24. Bearings 22 and 23 define the gyro spin axis. A multicontact switch 26 consists of switch levels 26a, 26b, 26c and 26d. There are five contact positions on each level. A motor 25 connected to a 3-phase power source (A, B and C) through multicontact switch levels 26c and 26d is adapted for driving the rotor 20. It will be understood by those skilled in the art that the motor and other apparatus are shown in schematic form for ease of illustration. One preferable form of this gyroscopic motor, gimbals and rotor is described in application, Serial No. 259,192, entitled, "Flotation Gyroscope," filed November 30, 1951, by J. H. Slater et al., and assigned to North American Aviation, Inc., assignee of the present invention. Positions 0 and 1 of switch 26 are "off" positions in which the motor is disconnected from phases A and C of the power source. Positions 2 and 3 are "on" positions in which the motor is energized and the rotor driven in one direction of rotation. Position 4 is also an "on" position and provides for a reversal of the gyro rotor 20 by reversing phases A and C of the 3-phase power supply.

The inner gimbal 24 is free to rotate in bearings 27 and 28 contained in an outer gimbal or case 29. Case 29 (carrying with it the inner gimbal and rotor) is permitted to rotate in bearings 30 and 31 supported in the gyroscope frame 35. Affixed to the gyroscope frame 35 is shaft or axis 36 rotatably mounted via bearings 37 and 38 on base frame 39. Azimuth adjusting means may include a worm-gear 40 and worm 41 connected to rotate axis 36. Azimuth adjusting screw 42 is affixed to worm 41 for varying the azimuth position of the gyroscope frame 35. The position of the gyroscopic frame with respect to the earth may be noted by reading the relationship of the azimuth adjusting screw 42 with respect to the earth fixed dial 43. The base frame 39 and gyroscope frame 35 in practice will be fitted tightly enough so that when the azimuth adjusting screw 42 is unrotated, the gyroscope frame 35 may be assumed to be in rigid relation to the earth in one azimuth position. When the apparatus is arranged for operation, the axis of rotation of the frame 35 must be adjusted to a position parallel to the local earth vertical, i.e., aligned with line 13 previously shown in Figs. 1 and 2. This alignment is accomplished with a plurality of leveling screws 44, 45 and 46. Two bubble levels 47 and 48 arranged perpendicular to each other and lying in a plane perpendicular to the plane of frame 35 ordinarily provide the necessary information for aligning the frame 35 in a vertical position.

The output axis 50 of the gyroscopic system shown in Fig. 3 is defined by the bearings 27 and 28. The output axis carries a pickoff or electrical sensing device shown generally at 49 which is capable of generating an electrical signal proportional to the deflection of the inner gimbal 24 with respect to the gyro case 29. This pickoff may be any one of several types well-known in the art, e.g. variable reluctance or variable capacitance pick-offs are commonly utilized for this purpose. Power supply 51 is coupled to pick-off 49 for energizing the latter. The signal from pick-off 49 is suitably amplified in amplifier 52. The output of amplifier 52 is combined with the signal supplied by the power supply 51 in demodulator 53 so as to obtain a direct current or slowly fluctuating signal indicative by amplitude and sign of the displacement of gimbal 24 with respect to case 29. This signal is selectively supplied by switch level 26a to either torquer 67 through summing resistor 72 in switch position 1 or torquer 54 in switch positions 2, 3 and 4. Torquer 67 applies a torque to the gyro gimbal 24 about the gyro output axis 50. Torquer 54 supplies a torque to the gyro case 29 about the axis defined by the bearings 30 and 31.

The input axis 15 of the gyro (defined as being orthogonal to both the spin axis 21 and the output axis 50) carries a pickoff 55 which is capable of generating an electrical signal proportional to the rotational displacement of the case 29 with respect to the gyro frame 35. Pickoff 55 may be identical in structure to pickoff 49. Power supply 56 is coupled to pickoff 55 for energizing same. The output signal from the pickoff 55 is suitably amplified in amplifier 57 and combined with the output of power supply 56 in demodulator 58.

A recorder 59 is selectively connected by switch level 26b to the output of the demodulator 53 in switch position 1 and the output of demodulator 58 in switch positions 2, 3 and 4. The recorder 59 preferably drives a pen or stylus thereby providing a continuous record of the history with respect to time of either the rotational displacement of the gimbal 24 with respect to case 29 (switch position 1) or the rotational displacement of the case 29 with respect to frame 35 (switch positions 2, 3 and 4).

Direct current reference source 65, in conjunction with potentiometer 66 and summing resistor 71, and direct current reference source 69, in conjunction with potentiometer 70 and summing resistor 73, are used to generate an electrical current in a torquer 67 which exerts a torque on the inner gimbal 24 about the gyro output axis. As shown, the direct current sources "float" with respect to ground and the potentiometers have their midpoints grounded. Thus currents in both directions may be generated for energizing the torquer in either direction. The magnitude and direction of this torque can be adjusted by the potentiometers 66 and 70.

A rod or pin 75 is longitudinally adjustable in a bearing 76 provided in the gyro frame 35. This pin is adapted to engage a slot 77 in the gyro case 29. As hereinafter described during a portion of the operation of this gyro compass it is desirable to prevent the gyro case 29 from rotating about the input axis 15. Accordingly, during this operating mode, the pin 75 securely engages the case 29 and locks it with the frame 35.

A convenient readout indicator from the gyroscopic apparatus shown in Fig. 3 is a mirror 68 attached to the gyro case 29 so that the plane of its reflecting surface is parallel to a plane defined by the gyro output axis and the central or null position of the spin axis. The gyro input axis 15 is thus perpendicular to the plane of the mirror reflecting surface.

The operation of the gyroscopic apparatus shown in Fig. 1 is as follows: When the gyroscopic rotor 20 is spinning (switch positions 2, 3 or 4), outer gimbal or case 29 is a controlled element and is to be servo-operated in such a way that the rotation of the innermost gimbal 24 about the output axis 50 will be held at zero, or nearly so. This servo system comprises applying the output of the demodulator 53 to torquer 54 which applies a torque to the gyro case 29 about the axis defined by the bearings 30 and 31. This torque is established in such a direction as to cause precession of the gimbal 24 back to the position at which the output of the pickoff 49 is nulled. It may be recalled that the pickoff 49 detects the deflection of the gimbal 24 with respect to the case 29. Accordingly, the servo loop comprising pickoff 49, amplifier 52, demodulator 53 and torquer 54 stabilizes the gyro case 29 in space about the gyro input axis 15.

In the absence of disturbing torques as hereinafter described, the gyro case is thus "fixed" in space about the input axis, i.e., the space rate of rotation of the gyro case about the gyro input axis is zero. By zero space rate of rotation is meant that the average rate of rotation of the case in space with respect to the axis specified is zero over a period of at least several seconds; i.e., the servo loop may respond to random noise frequencies in the range of approximately 0.5 to 1000 c.p.s. and not affect the accuracy of the instrument. The rate of rotation of the gyro frame 35 about the input axis 15 is determined by the position of the apparatus on the earth, and by the rotation of the earth. As previously noted, the component of earth rate lying along the gyro input axis 15 is equal to $\Omega \cos \lambda \sin \phi$ where $\phi$ varies according to the azimuth position of the gyro input axis 15, $\lambda$ varies with the astronomical latitude of the location of the gyroscopic apparatus and the input axis is constrained to lie in a geoid tangent plane. Thus, with the case stabilized relative to bearings 30 and 31, the drift rate or relative rate of rotational displacement of the case 29 with respect to the frame 35 is a direct measure of the rate of rotation of the earth about the input axis 15. The rotational displacement is detected by pickoff 55 and recorded by recorder 59 from which the rate of change of the drift may be readily ascertained. The principal case of interest occurs when recorder 59 reads continuously at a fixed value, thereby showing zero change in angular displacement between the case 29 and frame 35, and when at the same time the input axis lies in a geoid tangent plane. Under these conditions, the gyro input axis 15 will be parallel to a true east-west line.

A very important feature of this invention is the capability of measuring and cancelling internal bias torques acting upon the gyroscope about its output axis. These extraneous disturbing torques are common to all gyroscopes and are attributable to imperfections in the gimbal bearings, mechanical stresses in electrical connections, residual unbalance acted upon by gravity, convection torque in the flotation fluid, the action of the earth's magnetic field on permeable material in the gimbal, etc. The torques cause an erroneous indicated rotation about the gyro input axis which is indistinguishable from the earth rate. An error is thus caused in the measurement of the earth rate (and accordingly an error is introduced in the azimuth measurement) unless the effect of these disturbing torques is cancelled. The measurement of error torques by suitably modulating the rotational velocity of the gyroscope rotor 20 has been demonstrated mathematically in the co-pending application, Serial No. 740,329, entitled "Gyro-Compass."

One mode of operating the gyroscopic apparatus of Fig. 3 for substantially cancelling the error torques and obtaining a precise measurement of azimuth direction is as follows: initially, a "coarse bias adjustment" is effected by energizing all portions of the gyro-compass with the exception of the gyro rotor 20. Multiple position switch 26 is therefore moved to position 1 wherein motor 25 is disconnected from phases A and C of the three phase power supply. In this position also, the output of the demodulator 53 is connected to torquer 67 and recorder 59. Direct current source 65, in conjunction with potentiometer 66 is used to supply power to torquer 67 so as to adjust the torque acting on the gimbal 24 until the recorder 59 gives a null indication. The potentiometer 70 connected to direct current source 69 is adjusted so as to supply zero current to torquer 67 in this adjustment step. When the recorder 59 gives a null indication, the relative rotational displacement between said case and said gimbal is zero and the torque exerted on the gimbal 24 by the torquer 67 exactly balances the internal bias torques acting on the output axis 50 due to fluid forces, electrical conductors, magnetic fields and the like other than those associated with rotation of the gyro rotor.

Since it is the function of this operation to cancel internal bias torques only, i.e., torques independent of gravity, it is necessary to eliminate other effects which are indistinguishable from bias torques. For this purpose, the adjustable pin 75 is provided to constrain the output axis in alinement with the local earth vertical by locking the gyro case in a vertical position. If this were not done, and the case allowed to rotate from the vertical position, the gravitational forces would produce unbalance forces dependent upon gravity which are indistinguishable from internal bias torques. It will be apparent to those skilled in the art that other means are available for holding the case in a vertical position. Instead of mechanically affixing the case in the desired vertical position, it could be done by electromechanical apparatus. For example, the output of the demodulator 58 (indicative of the displacement between the case and frame) could be connected to torquer 54 thereby providing a servo loop for maintaining the case substantially at null position with respect to the frame.

The "coarse bias" torque signal stored in potentiometer 66 is applied throughout the succeeding steps of adjustment.

A "coarse alinement adjustment" is then made so as to approximately aline the gyro input axis with the true east-west line. For this measurement switch 26 is placed in position 2 thereby energizing the gyro rotor (switch levels 26c and 26d), connecting the output of demodulator 53 with torquer 54 (switch level 26a), and connecting the output of demodulator 58 with the recorder 59 (switch level 26b) pin 75 having been disengaged from slot 77. By rotating the azimuth adjusting screw 42, the gyro case 29 is adjusted in increments about axis 36 until the recorder 59 shows no change in angular displacement of the gyro frame with respect to the gyro case. At this point, the input axis of the gyro is approximately alined with the true east-west line.

A "fine bias adjustment" provides a measurement of the additional bias torques acting upon the gyroscope gimbal about the output axis when the gyroscope rotor is energized. Such torques are primarily caused by vibration and thermal changes. Initially, the rotor 20 is caused to turn at full speed in one direction by locating the multiple position switch 26 in position 3. All switch connections are as in position 2 and recorder 59 continues to measure the rate of rotation of the gyro frame 35 with respect to the case 29. The source of direct current potential 69 and potentiometer 70 are then used to adjust the torque acting on the gimbal 24 about the output axis 50 until the recorder 59 shows zero change in rotational displacement of the gyro frame with respect to the case, i.e., when the recorder 59 holds a fixed pen displacement. The position of the potentiometer 70 which is indicative of the magnitude of current in the torquer 67 from reference 69 is then noted. Multiple position switch 26 is then moved to position 4 wherein only the connections on switch levels 26c and 26d are changed for reversing the motor 25. Accordingly, the rotor 20 is also reversed and brought to full speed in the opposite direction. During the period in which the rotor is being reversed it may be desirable to "clamp" or hold the case at approximately zero position with respect to the frame, and "clamp" or hold the gimbal at approximately zero position with respect to the case. This is readily accomplished by known techniques and is shown for example in the co-pending application, Serial No. 740,329, entitled "Gyro-Compass." Upon attainment of full speed in the reverse direction potentiometer 70 is again adjusted until the recorder 59 shows zero change in rotational displacement of the gyro case with respect to the gyro frame. Again the setting of the potentiometer 70 indicative of the magnitude of the current in the torquer 67 from reference 69 is noted. The potentiometer 70 is then set to the average of the two positions previously determined taking account of sign, i.e., the torquer current is adjusted to the average of the previously noted currents. This average setting of current in the torquer 67 provides the precise amount of torque needed to compensate for the internal bias torques acting on the gimbal about the output axis. Once the average net torque acting on the gimbal 24 about the output axis has been reduced to zero, the average rate of rotation in space of the case about the input axis 15 is precisely zero.

A "final alinement adjustment" consists of rotating the azimuth adjusting screw 42 so as to adjust the gyroscope frame in azimuth until the recorder 59 indicates no relative rate of rotation of the gyro case with respect to the gyro frame by reading continuously at a fixed value. The gyro frame is then precisely aligned parallel with a true east-west line.

In practical operation the true east-west line established by the gyro input axis may be observed by noting the axis perpendicular to the plane of mirror 68. For this purpose, an autocollimator (not shown) or other optical device containing internal azimuth scales of the required precision, incorporating appropriate means for adjustment of the line of sight may be utilized to determine the position of the mirror axis in space. The co-pending application, Serial No. 740,329, entitled "Gyro-Compass,"

contains a showing of this and other methods of determining the location of the gyro input axis.

An alternative method of operating the gyroscopic apparatus of Fig. 1 dispenses with the requirement of the direct current supply 69 and potentiometer 70. The "coarse bias" and "coarse alinement" adjustments are identical to those hereinbefore described. The "fine bias adjustment" is then made as follows: With the multiple position switch 26 at switch position 3, the rotor 20 is rotated in one direction at its normal operating velocity. The gyroscopic frame 35 is then located in azimuth by turning the azimuth adjusting screw 42 until the recorder 59 detects no relative rate of rotation between the case and the frame. The position of the azimuth adjusting screw with respect to the dial 43 is then noted. Switch 26 is then placed in its position 4 in which the rotor 20 is rotated in the opposite direction at its normal spin velocity. Again the gyroscopic frame 35 is rotated in azimuth by turning the azimuth adjusting screw 42 until the recorder 59 gives no indication of any relative rate of rotation between the case and the frame. Again, the position of the azimuth adjusting screw 42 with respect to the dial 43 is noted. The azimuth adjusting screw 42 is then set to the average of the two readings just taken. The "final alinement adjustment" consists only of setting the gyroscopic frame at this average position, wherein the effect of the internal bias torques is cancelled, and the input axis of the gyro is precisely alined parallel with a true east-west line.

An advantage of the present gyro-compass is that it is relatively insensitive to earth vibrations. By isolating the gyro rotor from the earth by a set of two gimbals, earth vibrations are damped by the gyroscopic apparatus and do not affect the accuracy thereof. For this reason the present gyro-compass may be preferred to the apparatus described in the co-pending application, Serial No. 740,329, entitled "Gyro-Compass" wherein the gyro rotor is isolated from the earth by a single gimbal.

It will be apparent to those skilled in the art that, as an alternative to the use of recorder 59, two or more signal readings from a voltmeter separated by an interval or intervals of time could be used to determine the relative rate of rotation of the case with respect to the frame.

Heretofore, the adjustments in the positions of the gyro case and adjustment of the potentiometers has been indicated to be manual. However, these adjustments can be performed by automatic equipment applied in a fashion well-known in the art. In particular, each step of the adjustment is governed by the recorder 59, and continued until it reads continuously at a fixed value. Two readings separated by an interval of time could be automatically recorded and compared for determining whether there was zero rate of rotation between the case and the frame. In response to this measurement a servo-amplifier could drive a servo-motor, which would perform each of the adjustments in turn via suitable coupling means.

This gyro-compass may also be used to determine latitude on the earth. As hereinbefore described and shown in Fig. 2, the component of earth rate along the gyro input axis is proportional to cos λ, λ varying with the latitude. The latitude measurement is made after the true east-west direction is determined. The gyro case is then rotated through exactly 90 degrees in azimuth and a new setting of the potentiometer 70 required to achieve zero relative rate of rotation of the case with respect to the frame is determined. The change in this setting or current is then proportional to cos λ.

The gyro-compass in this invention has been described in terms of measuring a true east-west cardinal azimuth. Any other direction than the east-west line may be measured once the true east-west line is determined by providing a known torque on the gyro gimbal. For this measurement, potentiometer 70 is adjusted to a predetermined scale factor relating dial setting to directional offset from an east-west line (for a given latitude). The condition of zero rate of rotation of the case with respect to the frame is then again sought; but when the condition is achieved, the gyro input axis is displaced from east-west by an amount and direction depending upon the amount and direction of the net torque applied to the gyro gimbal by means of the torquer 67 energized from potentiometer 70.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A gyro-compass including a two axis gyroscope having a rotor adapted to be rotated in either direction, bearings supporting said rotor and defining the gyro spin axis, a gimbal mounting said rotor bearings and rotatably supported by bearings which define the gyro output axis, a gyro case supporting the bearings in which the gimbal is mounted, bearings supporting said case and defining a gyro input axis orthogonal to both said spin axis and said output axis, a frame mounting said case supporting bearings, first detecting means for detecting rotational displacement of the gimbal with respect to the case about said output axis, means responsive to said first detecting means for applying a torque to the gimbal about said input axis to reduce the rotational displacement between said case and said gimbal to substantially zero, means for measuring and applying a torque to the gimbal about the output axis to balance the error torque acting on the gimbal about the output axis when the gyro rotor is rotating as well as when said rotor is non-rotating, second detecting means for detecting rotational displacement of said case with respect to said frame about said input axis, frame mounting means for supporting said frame rotatably about an azimuth axis and means for adjusting said frame in azimuth relative to said frame mounting means so as to aline said input axis with a true east-west cardinal azimuth.

2. The combination of claim 1 including a means for torquing the gyro case, relative to said frame about said gyro input axis and wherein said frame mounting means includes means for adjusting the gyro frame so that said input axis is constrained in a plane tangent to the geoid.

3. A method for determining azimuth direction on earth with a gyroscope having an earth mounted frame, a case rotatably mounted on said frame, a gimbal rotatably mounted on said case, and a rotor mounted on said gimbal, comprising the following steps: applying a torque to said gimbal about the gyroscope output axis during the succeeding steps to cancel internal bias torques, spinning said gyroscope in a forward direction, applying to said gyroscope about its output axis a second measured torque sufficient to cause zero change in rotational displacement between said case and said frame while said rotor is spinning in a forward direction, spinning said gyroscope in a reverse direction, applying to said gyroscope about its output axis a third torque sufficient to cause zero change in rotational displacement between said case and said frame while said rotor is spinning in a reverse direction, an angularly adjusting said gyroscope about said output axis an amount sufficient to zero the drift rate between said case and said frame due to earth rotation, said last mentioned step including applying to said gyroscope about its output axis a fourth torque in accordance with the average of said second and third torques.

4. A method for determining azimuth direction on earth with a gyroscope having an earth mounted frame, a case rotatably mounted on said frame, a gimbal rotatably mounted on said case, and a rotor mounted on said gimbal, comprising the following steps: constraining the gyroscope input axis in alinement with the local earth horizontal, constraining the gyroscope output axis in alinement with the local earth vertical and during the succeeding steps applying to said gimbal about said output axis the torque required when said rotor is non-rotating to cancel the relative rotational displacement between said case and said gimbal, removing said constraint upon said output axis, rotating said rotor in one direction and applying a torque to said gimbal about said output axis to cause zero change in rotational displacement between said case and said frame, rotating said rotor in the opposite direction and applying a torque to said gimbal about said output axis to cause zero change in rotational displacement between said case and said frame, applying a torque to the gimbal about said output axis which is the average of the torques applied for respectively opposite spin directions, and adjusting the gyroscope in azimuth about said output axis while so torqued with said average torque until the change of rotational displacement between said case and said frame is zero.

5. A gyro-compass comprising a gyro having a frame, means for supporting said frame rotatably so that the gyro input axis is constrained in a plane tangent to the geoid, a case rotatably supported by said frame about the gyro input axis, a gimbal rotatably supported by said case about the gyro output axis; a rotor rotatably supported by said gimbal about the spin axis, and a reversible motor drive adapted for rotating said rotor in both clockwise and counter-clockwise spin directions; a first electrical pickoff connected to both said case and said gimbal for detecting rotational displacement of the gimbal with respect to said case about said output axis and generating a signal indicative of the magnitude and direction of said displacement; a first electrical torquer adapted to torque said gimbal about said output axis; a second electrical torquer adapted to torque said case about said input axis; a servo loop including said first electrical pickoff and one of said electrical torquers, a second electrical pickoff connected to both said case and said frame for detecting relative rotational displacement of the case with respect to said frame about said input axis and generating a signal indicative of the magnitude and direction of said displacement; a recording device; a power supply coupled to said first electrical torquer for energizing same; and switch means for alternatively coupling said recording device to said power supply for recording the magnitude and direction of current flowing to and energizing said torquer or coupling said recording device to one of said pickoffs for recording the magnitude and direction of the detected rotational displacement.

6. A method for determining azimuth direction on earth with a gyroscope having an earth mounted frame, a case rotatably mounted on said frame, a gimbal rotatably mounted on said case, and a rotor mounted on said gimbal, comprising the following steps: constraining the gyroscope input axis in alinement with the local earth horizontal, constraining the gyroscope output axis in alinement with the local earth vertical and during the succeeding steps applying to said gimbal about said output axis the torque required when said rotor is non-rotating to cancel the relative rotational displacement between said case and said gimbal, removing said constraint upon said output axis, rotating said rotor in one direction and adjusting the gyroscope in azimuth about said output axis until there is zero change in rotational displacement between said case and said frame, rotating said rotor in the opposite direction and adjusting the gyroscope in azimuth about said output axis until there is zero change in rotational displacement between said case and said frame, and adjusting the gyroscope in azimuth about said output axis to the average of the azimuth positions at which there is zero change in rotational displacement between the gyroscope case and frame for opposite directions of rotor spin.

7. In a gyro-compass including a two axis gyroscope having a rotor, a gimbal, first bearings rotatably supporting said rotor on said gimbal, a case, second bearings rotatably supporting said gimbal on said case, said second bearings defining the gyroscope output axis, a frame, and third bearings rotatably supporting said case in said frame, said third bearings defining the gyroscope input axis and being orthogonal to both the rotor spin axis and said output axis; means for supporting said frame rotatably about an azimuth axis, means for stabilizing said case about said gyroscope input axis, means for storing a signal indicative of internal torques acting on said gyroscope gimbal when said rotor is not rotating, means for storing a signal indicative of bias error torques acting on said gyroscope gimbal when said rotor is rotating, means responsive to said stored signals for applying an error compensating torque to said gimbal, means for measuring the relative rotational displacement between said case and said frame, and means for rotatably positioning said frame in azimuth relative to said frame supporting means, whereby when said measuring means indicates a constant relative rotational displacement between said case and said frame, said frame is alined with a true east-west cardinal azimuth.

References Cited in the file of this patent
UNITED STATES PATENTS

| | | |
|---|---|---|
| 2,835,131 | Vacquier et al. | May 20, 1958 |
| 2,902,772 | Ciscel | Sept. 8, 1959 |